United States Patent [11] 3,603,623

[72] Inventor Michael U. Widman
 Columbus, Ohio
[21] Appl. No. 2,043
[22] Filed Jan. 12, 1970
[45] Patented Sept. 7, 1971
[73] Assignee The Wooster Brush Company
 Wooster, Ohio

[54] SPRING LOCK FOR TELESCOPING MEMBERS
 8 Claims, 5 Drawing Figs.
[52] U.S. Cl. ................................................ 287/58 CT,
 192/81
[51] Int. Cl. .................................................... F16b 7/14
[50] Field of Search ........................................ 192/81 C,
 81; 287/58 CT, 126, 119, 115, 110; 279/23;
 188/67

[56] References Cited
 UNITED STATES PATENTS
 512,275 1/1894 Burgess ........................ 188/67 UX

| 2,595,213 | 4/1952 | Raynor | 192/81 C |
| 2,805,089 | 9/1957 | Hansen | 285/321 X |
| 3,230,595 | 1/1966 | Kedem | 192/81 C |

FOREIGN PATENTS

| 706,287 | 3/1931 | France | 192/81 C |
| 604,883 | 2/1926 | France | 192/81 C |

Primary Examiner—David J. Williamowsky
Assistant Examiner—Andrew V. Kundrat
Attorney—Oberlin, Maky, Donnelly & Renner ABSTRACT: A spring lock for releasably retaining a pair of telescoping members in adjusted longitudinal and rotational orientation including a pair of coil lock springs disposed around the inner member and having one end fixed with respect to the outer member. The lock springs normally frictionally engage the outer surface of the inner member, and are wound in the same direction, but they are reversed so that they may be expanded by movement of the other ends of the lock springs toward each other to release the inner member.

PATENTED SEP 7 1971 3,603,623
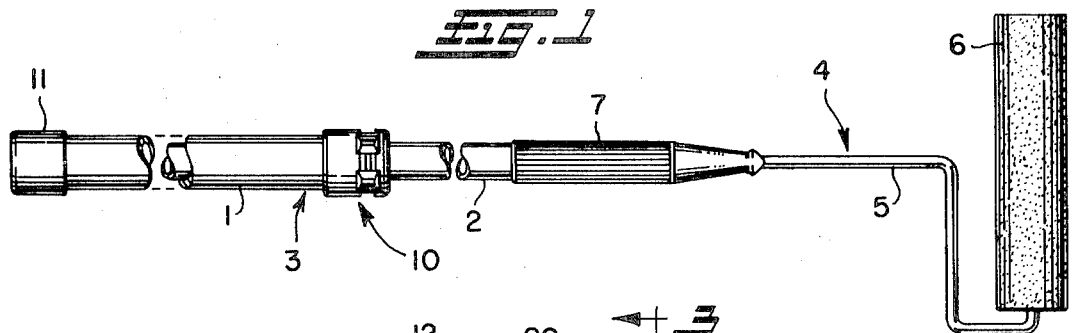
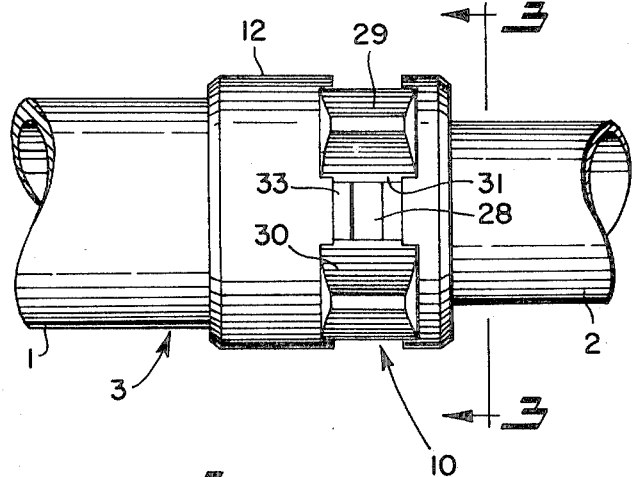
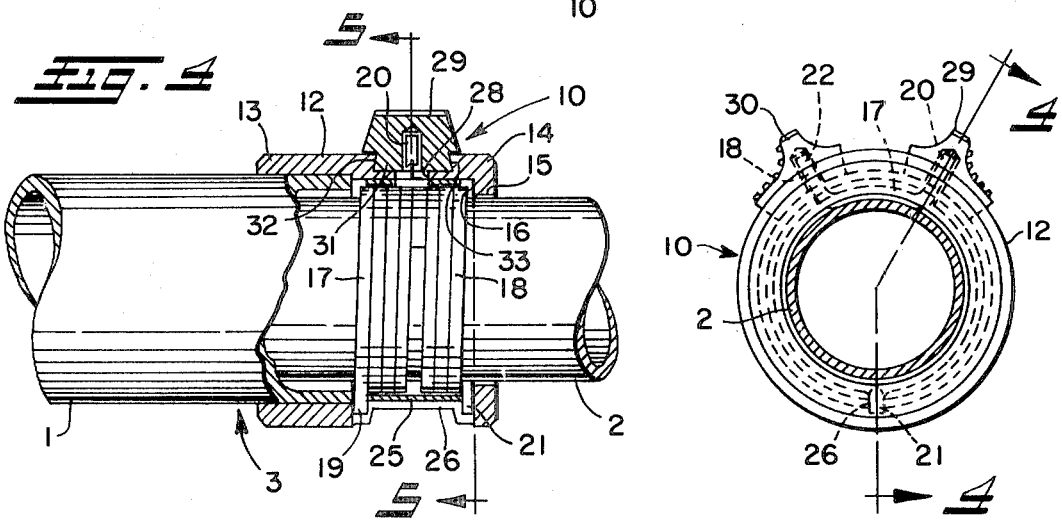
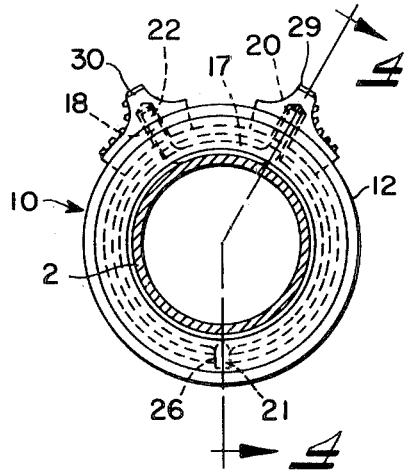
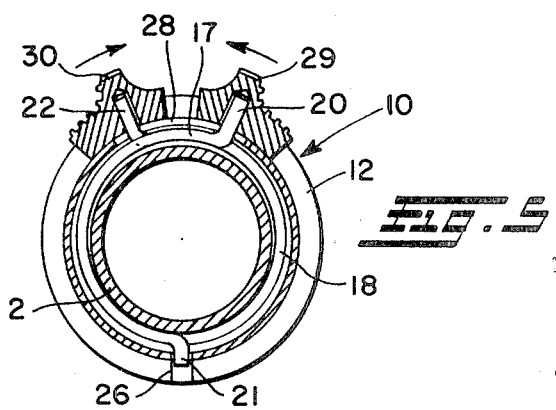
INVENTOR
MICHAEL U. WIDMAN
BY Oberlin, Maky, Donnelly & Renner
ATTORNEYS

3,603,623

SPRING LOCK FOR TELESCOPING MEMBERS

BACKGROUND OF THE INVENTION

The present invention relates generally as indicated to a spring lock for telescoping members and more particularly to a lock of a type which may readily be released to permit adjustment of the overall length of the telescoping members and yet positively retains the members against both relative longitudinal and rotational movement when in the locked position.

There are numerous uses which may be made of members that are readily adjustable to vary the overall length thereof, as for example, they may be used as handle extensions for such devices as paint rollers and the like for painting ceilings and other out-of-reach surfaces without the need for a ladder. The lock for the telescoping members should be simple and easy to operate, but at the same time the lock must be capable of positively retaining the telescoping members in adjusted position despite the loads which may be incurred during use.

Various types of locking devices have already been devised for telescoping members, but they have not been found to be entirely satisfactory for one reason or another. Some are either too expensive or difficult to operate; others do not effectively lock the members against both relative longitudinal and rotational movements; and still others do not readily release the members to permit adjustment when desired.

SUMMARY OF THE INVENTION

With the foregoing in mind, it is a principle object of this invention to provide a locking device for telescoping members which is of a relatively simple and inexpensive construction and permits ready adjustment of both the longitudinal and rotational orientation of one member relative to the other.

Another object is to provide such a locking device which positively locks the telescoping members in adjusted position despite the loads which may be applied to the telescoping members during use.

Still another object is to provide such a locking device for telescoping members in which the holding strength is independent of the lock actuating force.

A further object is to provide such a locking device which requires a relatively low force and only a slight movement to operate the locking device.

Still another object is to provide such a locking device which is capable of locking the telescoping members in any desired longitudinal and rotational orientation with full locking force.

Still another object is to provide such a locking device which acts independently of loads applied to the telescoping members, and which cannot be accidentally released.

These and other objects of the present invention may be achieved by a locking device consisting of a pair of identically wound coil lock springs each having one end fixed with respect to the outer telescoping member. The lock springs surround the inner telescoping member and normally frictionally engage the outer surface thereof, but the springs are reversed so that they face each other, whereby movement of the other ends of the springs toward each other will cause the springs to expand or unwind to release the inner member.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

In the annexed drawing:

FIG. 1 is a fragmentary side elevation view of a pair of telescoping members used as a handle extension for a conventional paint roller, such telescoping members being shown releasably retained in adjusted position by a preferred form of spring lock constructed in accordance with the present invention;

FIG. 2 is an enlarged side elevation view of the spring lock of FIG. 1 and adjacent portions of the telescoping member;

FIG. 3 is an end elevation view of the spring lock of FIG. 2 as seen from the plane of the line 3—3, except that the lock has been rotated slightly for purposes of clarity;

FIG. 4 is a fragmentary longitudinal section through the spring lock of FIG. 3, taken on the plane of the line 4—4 thereof; and FIG. 5 is a transverse section through the spring lock of FIG. 4, taken on the plane of the line 5—5.

DESCRIPTION OF THE PREFERRED EMBODIMENT

Referring now in detail to the drawing and first particularly to FIG. 1 thereof, there is shown a pair of outer and inner telescoping members 1 and 2 which are being used as a handle extension 3 for a paint roller 4. Such paint roller 4 may be of conventional design, including a paint roller frame 5 for supporting a roller 6 at one end and a handle 7 at the other end. The handle 7 may have an internally threaded bore in the outer end for threaded attachment to one end of the handle extension 3, and such inner and outer members 1 and 2 may be releasably retained in longitudinal and rotational adjusted position with respect to each other using a novel locking device 10, the details of which are more clearly shown in FIGS. 2 through 5 and will be subsequently fully described.

The outer member 1 is of tubular section, with the inner diameter being slightly greater than the outer diameter of the inner member 2 for telescopic receipt of the inner member 2 within the outer member 1. The inner member 2 may either be of a solid or tubular section, but a tubular section is preferred for reduced weight, and both members 1 and 2 are desirably made of a suitable lightweight material such as aluminum which has sufficient strength to provide proper support for the paint roller 3 during use. A protective end cap 11 may be placed over the outer end of the outer member 1 which is remote from the inner member 2.

As best seen in FIG. 4, the locking device 10 includes a sleeve portion 12 having one end 13 extending over the inner end of the outer member 1 and the other end 14 projecting longitudinally therefrom and having a central longitudinal opening 15 therein through which the inner member 2 projects. The sleeve portion 12 may be secured to the outer member 1 as by indenting or peening. Contained within the sleeve 12 longitudinally outwardly of the outer member 1 is a pair of longitudinally spaced coil lock springs 17 and 18 which surround the inner member 2 and releasably grip the same. The inner diameter of the sleeve 12 may be undercut as shown for receipt of the springs 17 and 18 between a shoulder 16 on the sleeve and the inner end of the outer member 1, such springs 17 and 18 consisting of one or more complete turns of spring wire each having out-turned ends 19, 20 and 21, 22, respectively, at opposite ends of the springs. The ends 19 and 21 of the coil springs 17 and 18 may be maintained in spaced apart relation as by placing a spacer 25 therebetween, and such ends 19 and 21 are fixed to the sleeve 12 as by providing a longitudinally extending slot 26 in the sleeve for receipt of such ends, or holes may be provided in the sleeve 12 for that purpose. The other ends 20 and 22 of the coil springs 17 and 18 are desirably in substantially the same transverse plane and extend radially outwardly through a circumferential slot 28 in the sleeve 12 for connection to knobs 29 and 30, respectively. Preferably, the knobs 29 and 30 are made of a suitable plastic material and have tongue portions 31 with outwardly tapered sides 32 as shown in FIG. 4 which may be distorted to permit assembly within a correspondingly shaped peripheral groove 33 in the outer periphery of the sleeve 12 intersected by the slot 28 for retaining and guiding the knobs 29 and 30 for movement toward and away from each other.

As best seen in FIGS. 4 and 5, the coil springs 17 and 18 are wound in the same direction, but one of the springs is reversed so that they face each other with the other ends 20 and 22 of the springs closely adjacent each other, whereby movement of the knobs 29 and 30 toward each other will cause a slight unwinding of the springs, sufficient to expand the springs and release the inner member 2 from frictional engagement thereby. With the springs thus expanded, the members 1 and 2 are free to be moved both longitudinally and rotationally with respect to each other to adjust the overall length and rotational orientation of the tubular members as desired. Afterwards, the knobs 29 and 30 are released whereupon the coil springs 17 and 18 reengage the inner member 2 for positively retaining the tubular members in adjusted position.

The amount of force and distance required to move the knobs 29 and 30 toward each other to expand the springs sufficiently to release the inner member 2 are quite small, whereby the out-turned ends 20 and 22 of the springs may be located relatively close to each other as shown so that the required force may readily be applied by gripping the knobs 29 and 30 between the thumb and first finger of one hand. Moreover, since the knobs need only be moved a slight distance toward each other to effect release of the inner member 2 by the coil springs 17 and 18, such release is substantially instantaneous.

Another advantage obtained in using the locking device of the present invention is that the locking force is effective in retaining the telescoping members 1 and 2 against longitudinal movement in either direction and also against rotational movement, and the lock holding strength is independent of the lock actuating force. Any rotating force applied to the inner member 2 acting in a direction tending to unwind one of the springs will at the same time tend to tighten the other spring and vice versa. Accordingly, the telescoping members may be retained in any longitudinal and rotational orientation with full locking force, and any loads which are applied to the telescoping members during use will not act in any way to release the lock. Moreover, both knobs 29 and 30 must be released to unlock the telescoping members, thus making accidental release of the lock very unlikely.

I, therefore, particularly point out and distinctly claim as my invention:

1. A locking device for a pair of members, one of which is telescopically received in the other, said locking device comprising a pair of coil springs surrounding said one member and in frictional engagement therewith, means for attaching one of each of the ends of said coil springs to said other member, the other ends of said coil springs being lapped side-by-side and extending past each other and movable with respect to said other member, said coil springs being wound in the same direction but one of said coil springs is reversed, whereby movement of said other ends of coil springs back toward each other will expand said coil springs to release said one member from frictional engagement thereby, said other ends of said coil springs being closely adjacent each other to facilitate such movement toward each other.

2. The locking device of claim 1 wherein said means for attaching said one ends of said coil springs to said other member comprises a sleeve attached to said other member and having a longitudinally projecting portion therefrom, said sleeve having an opening through which said one member projects into said other member, said coil springs being contained within said longitudinally projecting portion of said sleeve, said sleeve having a longitudinal slot therein for receipt of said one ends of said coil springs, said sleeve further having a circumferential slot through which said other ends of said coil springs extend for connection to knobs.

3. The locking device of claim 2 wherein said sleeve has a shoulder adjacent said opening, said springs being disposed between said shoulder and the adjacent end of said other member.

4. A locking device for a pair of outer and inner telescoping members comprising spring means surrounding said inner member and in frictional engagement therewith, said spring means comprising a pair of coil springs surrounding said inner member and in frictional engagement therewith, said coil springs each having one of their ends fixed with respect to said outer member and their other ends movable toward each other for expanding said coil springs to release said inner member from frictional engagement thereby, said other ends of said coil springs being located relatively close to each other and having knobs thereon for engagement between the thumb and first finger of one hand to apply the required force to expand said springs as aforesaid.

5. A locking device for a pair of outer and inner telescoping members comprising spring means surrounding said inner member and in frictional engagement therewith, said spring means having one end fixed with respect to said outer member, and the other end being movable with respect to said outer member for expanding said spring means to release said inner member from frictional engagement thereby, and a sleeve attached to one end of said outer member and having a longitudinally projecting portion therefrom, said sleeve having an opening through which said inner member projects into said outer member, said spring means being contained within the longitudinally projecting portion of said sleeve, one end of said spring means being fixed to said sleeve, said sleeve having a circumferential slot through which the other end of said spring means extends for connection to a knob, and a peripheral groove intersected by said circumferential slot, said knob having a tongue portion which is received in said groove for retaining and guiding said knob along said groove.

6. A locking device for a pair of members, one of which is telescopically received in the other, said locking device comprising a pair of coil springs surrounding said one member and in frictional engagement therewith, means for attaching one of the ends of said coil springs to said other member, the other ends of said coil springs being movable with respect to said other member, said coil springs being wound in the same direction but one of said coil springs is reversed, whereby movement of said other ends of said coil springs toward each other will expand said coil springs to release said one member from frictional engagement thereby, said means for attaching said one ends of said coil springs to said other member comprising a sleeve attached to said other member and having a longitudinally projecting portion therefrom, said sleeve having an opening through which said one member projects into said other member, said coil springs being contained within said longitudinally projecting portion of said sleeve, said sleeve having a longitudinal slot therein for receipt of said one ends of said coil springs, said sleeve further having a circumferential slot through which said other ends of said coil springs extend for connection to knobs, said one ends of said coil springs being longitudinally spaced apart, and said other ends being in substantially the same plane transverse to the longitudinal axis of said members.

7. The locking device of claim 6 further comprising a spacer interposed between said one ends of said springs.

8. The locking device of claim 1 wherein said one ends of said coil springs are longitudinally spaced apart, and said other ends are in substantially the same transverse plane.